Patented July 20, 1937

2,087,282

UNITED STATES PATENT OFFICE 2,087,282

OIL SOLUBLE AZO DYES AND PROCESSES OF MAKING THEM

Martin E. P. Friedrich, Carneys Point, and Francis H. Smith, Woodstown, N. J., assignors to E. I. du Pont de Nemours & Company, Wilmington, Del., a corporation of Delaware No Drawing. Application June 4, 1935, Serial No. 24,868

9 Claims. (Cl. 260—96)

A. This invention relates to new compositions of matter being mixtures of organic compounds useful in the manufacture of azo dyestuffs. The invention will be described with particular respect to the preparation of an oil-soluble red, but it is to be understood that the particular description is not limitative.

B. The use of azo dyestuffs for the coloring of oils, fats, and waxes is known. One of the problems which arise in the coloring of these materials comes from the fact that certain dyes have excellent color but a solubility so low that their use is not attended by satisfactory results. It is an object of this invention to prepare a dyestuff intermediate which is of high solubility and which, when coupled to azo dyestuff coupling components, produces dyestuffs which also have superior degrees of solubility in oil.

C. The objects of the invention are attained, generally speaking, by diazotizing portions of a mixture containing aniline, toluidine, and xylidine, so that the diazotized compounds will couple with the undiazotized compounds to form diazoamino compounds, and converting the diazoamino compounds to aminoazo compounds. In the mixture so formed the aminoazo derivatives corresponding to the following formulae have been identified:

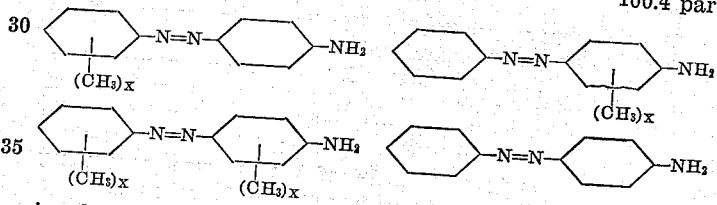

in which X is 1 or 2. There may also be present more complex compounds formed by the coupling of more than two primary compounds.

D. In practicing the invention the primary raw materials used are aniline, any or all of the ortho, meta, or para isomers of toluidine, and any or all of the isomeric xylidines.

E. Diazotization in the preferred form of the invention will be carried out by stepwise addition of the nitrite to the acid solution of the amines, whereby the temperature of the reaction is kept under control as diazotization proceeds. The formation of the diazoamino compounds by the coupling of diazotized amines to aryl nuclei of the bath proceeds most favorably when the sodium nitrite added has materially reduced the acidity of the bath. Alternatively, diazotization may be carried out in one step by diazotizing at once approximately half of the raw materials, but the difficulty of controlling the temperature makes this procedure less desirable.

F. The diazoamino compounds formed by the preceding processes will be converted to aminoazo compounds by any satisfactory process, illustrations of which are found elsewhere herein.

G. Because it will frequently be desirable to keep and use the new aminoazo compounds in the form of their hydrochlorides, the hydrochlorides and methods of forming them are described and claimed elsewhere herein.

H. The following examples, in which parts are by weight, are illustrative but not limitative of the invention.

Example I

An enamelled pot, equipped with an enamelled agitator, and having a jacket to circulate a heating or cooling medium, was charged with 77.2 parts of aniline, 88.8 parts of ortho-toluidine, and 100.4 parts of a mixture of xylidines (containing chiefly the ortho and para isomers). Agitation was begun and continued throughout the process. 49.3 parts of hydrochloric acid (30%) were introduced below the surface of the amines, the solution was cooled and kept at 18–20° C. for about three hours, during which 70 parts of sodium nitrite were added in small batches. The temperature was raised and held at 30–33° C. until the conversion of the diazoamino bodies into the aminoazo bodies was completed, requiring about four hours.

The mixed aminoazo compounds were precipitated in finely divided form as the hydrochloride by quickly adding to the charge 238 parts of (37%) hydrochloric acid, keeping the temperature below 40° C. The charge was diluted with about 200 parts of water, agitated for about three hours at 20–25° C., filtered, and the precipitate washed three times with 5% hydrochloric acid, yielding about 515 parts (98% of theoretical) of a paste 49.7% pure. The composition of the bulk of the paste expressed as the hydrochloride is represented by the formula:

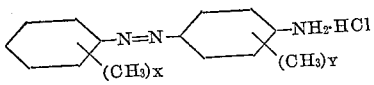

in which X and Y are 0, 1, or 2.

The product was converted to an azo color in the following manner:

The hydrochlorides of the mixed aminoazo compounds (261.5 parts—100%) were stirred with 1500 parts of water for about half an hour, 247 parts of hydrochloric acid (37%) were added with enough ice to bring the temperature to 5–7° C., and 75 pounds of sodium nitrite were admixed in one portion. The mixture was stirred for about 30 minutes at 9–11° C., clarified by adding decolorizing charcoal, and filtered. The total volume of the filtrate was adjusted to an equivalent of 5000 parts of water, was poured into a vigorously agitated coupling solution prepared from 2200 parts water, 112 parts soda ash, 50 parts caustic soda, and 165 parts beta-naphthol, held at a temperature of 9–11° C. An excess of beta-naphthol solution was present at all times. The mixed solution was stirred for about 30 minutes at 9–11° C., heated slowly to about 35° C., cooled to 25° C., and filtered. The dye was freed of inorganic salts by washing with water and dried at 35–50° C. in a vacuum. It was a bronzy dark red powder insoluble in water but soluble in benzene, ethylene-dibromide, and gasoline to produce a red solution. It softened at 50–60° C.

*Example II*

A kettle, similar to that of Example I was charged with 380 parts of aniline, 437 parts of ortho-toluidine, and 465 parts of mixed xylidine (rich in ortho and para isomers). 400 parts of hydrochloric acid (37%) were added below the surface, with agitation, over a period of about half an hour. The mixture was cooled to 20–25° C. and 207 parts of sodium nitrite were added in batches in the course of an hour. The charge was agitated one hour at 20° C., three hours at 35–40° C., and was poured into a mixture of 7500 parts water and 1250 parts of hydrochloric acid (37%) at a temperature of 20–25° C. A precipitate was thrown down and was filtered, washed with dilute (2%) hydrochloric acid, and dried. 792 parts of a dark red product, 93.3% pure based on a molecular weight of 261.5, were obtained.

*Example III*

Hydrochloric acid (133.3 parts of 37%) was added below the surface, with agitation, to a mixture of 37.2 parts aniline, 278 parts of ortho-toluidine and 121.0 parts of a mixture of xylidines (mainly ortho and para). The mixture was cooled to about 20° C. and 69 parts of sodium nitrite were added slowly at 20–25° C. After agitation for about one hour at 20° C. and three hours at 35–40° C., tests showed that the conversion of the diazoamino compounds to the aminoazo compounds was complete, the oily mass was run into a mixture of 2500 parts water and 417 parts of 37% hydrochloric acid at 35–45° C., and the hydrochloride of the mixed aminoazo bodies precipitated and was separated by filtration, washed with 2% hydrochloric acid, and dried. 268 parts of a dark red product, 80.65% pure, were obtained.

I. An advantage of the invention is the production of intermediates which give azo dyestuffs having better solubility in oil or other solvents such as gasolene, toluene, or ethylene dibromide, than dyestuffs made from intermediates containing any of the single ingredients, or any combination of primary ingredients having fewer individual constituents. Another advantage of the invention is the production of intermediates which give azo dyestuffs that will not only dissolve in ethylene dibromide in higher proportion but will remain in solution, despite long-continued agitation, more completely than dyestuffs made from intermediates containing any of the single ingredients, or combinations of them having fewer individual constituents. Other advantages of the invention will be in part apparent and in part elsewhere herein set forth.

J. As many apparently widely different embodiments of the invention may be made without departing from the spirit and scope thereof, it is to be understood that we do not limit ourselves to the specific embodiments thereof except as defined in the appended claims.

We claim:

1. The process of making an intermediate, which comprises mixing 75.2 parts of aniline, 88.8 parts of ortho-toluidine, and 100.4 parts of mixed xylidines, introducing beneath the surface of the mixture 39.3 parts of aqueous hydrochloric acid (30%), cooling to 18–20° C., adding 70 parts sodium nitrite in small quantities over a period of about three hours, heating at 30–32° C. for about four hours, forming the hydrochlorides of the aminoazo compounds by introducing 238 parts of 30% hydrochloric acid at a temperature below 40° C., and separating the precipitate from the reaction mass.

2. The process of making an intermediate which comprises mixing substantial amounts of each of the aniline, toluidine, and xylidine, diazotizing a portion of the mixture and coupling the diazotized portions to aryl nuclei of the mixture and converting the diazoamino compounds to aminoazo compounds.

3. The process of making an intermediate which comprises mixing substantial amounts of each of the aniline, toluidine, and xylidine, diazotizing portions of the mixture and coupling them to aryl nuclei of the mixture, converting the diazoamino compounds of the mixture to hydrochloaminoazo compounds, forming the hydrochlorides of the aminoazo compounds, and separating them from the reaction mass.

4. The process of making an intermediate which comprises mixing substantial amounts of each of the aniline, toluidine, and xylidine, forming diazoamino compounds diazotizing portions of the mixed compounds with sodium nitrite in the presence of hydrochloric acid, and heating the diazoamino compounds at a moderate temperature until conversion to aminoazo compounds takes place.

5. A composition of matter containing substantial amounts of each of the mixed aminoazo compounds of the following formulas:
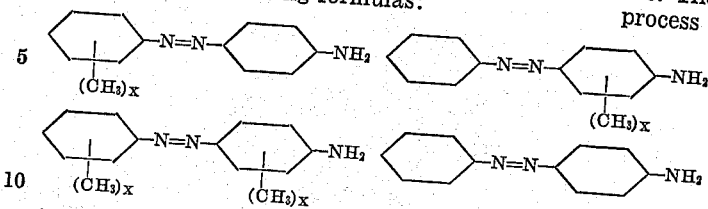
in which X is 1 or 2.
6. The composition of matter formed by the process of claim 1.
7. The composition of matter formed by the process of claim 2.
8. The composition of matter formed by the process of claim 3.
9. The composition of matter formed by the process of claim 4.
MARTIN E. P. FRIEDRICH.
FRANCIS H. SMITH.